United States Patent [19]

Frank et al.

[11] Patent Number: 4,635,695

[45] Date of Patent: Jan. 13, 1987

[54] LOCKING CONFIGURATION FOR A WHEEL RIM FLANGE RETAINING RING

[75] Inventors: Richard J. Frank, Akron; Donald H. Smith, Cuyahoga Falls, both of Ohio

[73] Assignee: Goodyear Aerospace Corporation, Akron, Ohio

[21] Appl. No.: 793,352

[22] Filed: Oct. 31, 1985

[51] Int. Cl.$^4$ .............................. B60B 25/18
[52] U.S. Cl. ........................ 152/410; 301/35 SL
[58] Field of Search .................. 301/35 SL; 152/408, 152/410

[56] References Cited

U.S. PATENT DOCUMENTS

| | | | |
|---|---|---|---|
| 906,167 | 12/1908 | Shaw | 152/408 |
| 3,608,607 | 9/1971 | Gerbeth | 152/410 |
| 4,209,052 | 6/1980 | French | 301/35 SL X |
| 4,552,194 | 11/1985 | Brown et al. | 301/35 SL |

Primary Examiner—David A. Scherbel
Attorney, Agent, or Firm—P. E. Milliken; L. A. Germain

[57] ABSTRACT

A split retaining ring 60 locking a separable tire bead flange 14 on a wheel rim 10 has inboard 60a and outboard 60b facing portions and circumferentially aligned terminal ends 40, 50, each terminal end characterized by a drilled-through bore 46, 56 extending in the axial direction of the ring from the inboard facing portion to the outboard facing portion. A lockwire 70 is positioned through each drilled bore 46, 56 to retain the terminal ends 40, 50 of the split ring in a predetermined circumferential spaced-apart relationship.

4 Claims, 5 Drawing Figures

LOCKING CONFIGURATION FOR A WHEEL RIM FLANGE RETAINING RING

BACKGROUND OF THE INVENTION

This invention pertains to wheel assemblies and more particularly to a wheel rim wherein an outboard positioned tire bead flange is designed to be separable from the main portion of the wheel rim. The separable outboard bead flange is secured on the wheel rim by means of a retaining ring received within an annular groove in the rim.

More particularly this invention pertains to a unique configuration for a wheel rim flange retaining ring and means to lock the ring on the rim in an emergency situation when such wheel is rotating at high speed, the mounted tire is deflated, and high centrifugal forces are present which tend to throw the retaining ring off of the wheel rim.

In a wheel assembly of this type, a deflated tire is firstly mounted on the wheel rim followed by the separable bead flange and finally by the retaining ring. Upon inflation of the mounted tire, the outboard tire bead forces the separable bead flange into contacting and locking engagement with the retaining ring. Alternatively, when the tire is deflated, the retaining ring is firstly removed followed by the separable bead flange and finally the deflated tire.

In the circumstance of a tire blowout when traveling at high speed, the outboard tire bead tends to work inboardly allowing the separable bead flange to follow in the same direction. Accordingly, the forceful engagement between the separable flange and retaining ring is lost and the ring may be thrown off of the wheel rim by the high centrifugal forces which are present. This, of course, results in a dangerous and serious situation especially as these type wheel assemblies are used for aircraft applications.

SUMMARY OF THE INVENTION

In light of the foregoing, it is in accordance with one aspect of the invention an object to provide a retaining ring configuration for a wheel assembly having a separable bead flange, which configuration provides locking of the retaining ring on the rim in the absence of a properly inflated tire and during the period of high centrifugal force such that the separable bead flange and tire are preserved on the wheel rim.

Accordingly, the invention is directed to a configuration for a split retaining ring having inboard and outboard facing portions and two circumferentially aligned terminal ends, each terminal end characterized by a bore passing axially through the material comprising the ring and carrying a portion of a wire fastening means which maintains the terminal ends in a predetermined spaced-apart relationship when the retaining ring is mounted on a wheel rim.

BRIEF DESCRIPTION OF THE DRAWINGS

For a complete understanding of the invention, reference should be made to the following detailed description and the accompanying drawings, in the several figures of which like reference numerals indicate like elements and in which.

DETAILED DESCRIPTION OF THE INVENTION

Figure 1:
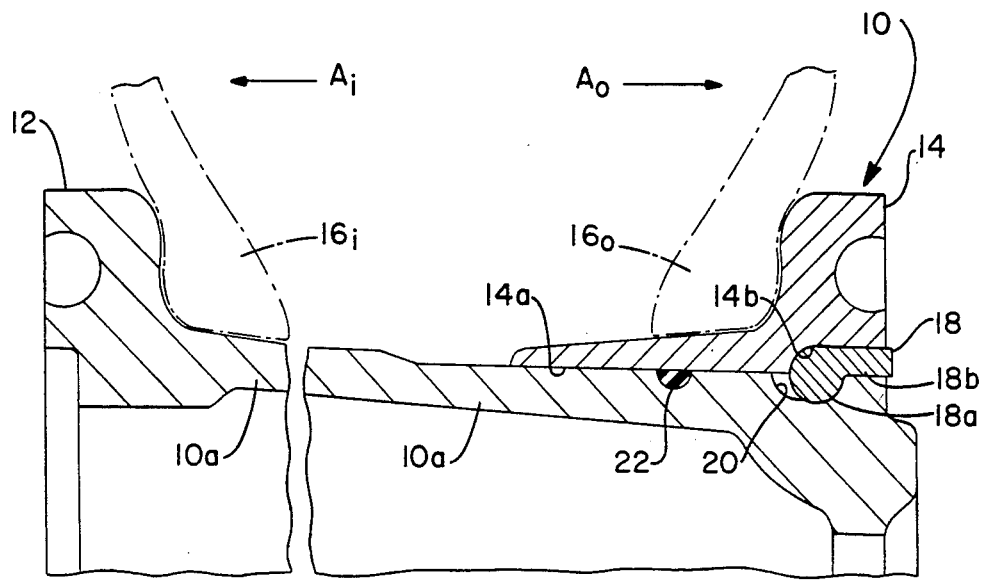
FIG. 1 is a partial sectional view of a prior art wheel rim showing a typical separable outboard bead flange and retaining ring configuration.

Referring firstly to FIG. 1 of the drawings, a prior art wheel rim is generally indicated by reference numeral 10, which wheel rim has designated inboard and outboard directions as indicated by reference arrows Ai and Ao respectively. It should be understood at the outset that FIG. 1 is a generalized showing of a wheel rim having a separable outboard tire bead flange and a flange retaining ring and is not intended to limit the invention to a particular wheel design or individual part configuration, there being numerous such designs within the prior art and known to persons working in the art. This invention therefore, may be applied to many of the prior art configurations. In any event, the wheel rim 10 conventionally includes an inboard tire bead flange 12 which is formed as part of the main body portion 10a of the rim 10 and a separable outboard tire bead flange 14 which is removable from the main body portion 10a in the direction of the arrow Ao. The tire beads are shown via ghost lines as they may be mounted in a tire-inflated condition on the wheel rim 10, the inboard bead being indicated by reference numeral 16i while the outboard bead is indicated by reference numeral 16o.

The separable bead flange 14 is an annular piece that is slidably received on the rim 10 in the inboard direction of arrow Ai and is thereafter retained on the rim by reason of a split retaining ring 18 positioned outboardly of the separable bead flange 14. The retaining ring 18 is characterized by an inboard bulbous portion 18a that is shown having a substantially circular cross-section but may have any geometrical cross-section, and a substantially flat lip or flange portion 18b that extends in the outboard direction when said retaining ring is mounted on the wheel rim 10. The bulbous portion 18a is seated in a mating annular groove 20 provided in the rim 10 while the bore 14a of the separable bead flange 14 has an annular groove 14b which effects an abutting engagement with the retaining ring 18 when forced to move outboardly on the rim as the mounted tire is inflated. An annular seal indicated at 22 may also be provided to maintain the leakproof integrity as between the separable bead flange 14 and the body portion 10a of the wheel rim 10.

From the foregoing description and a consideration of FIG. 1, it will be appreciated that a deflated tire may be easily mounted on the wheel rim 10 in the inboard direction of arrow Ai and thereafter the separable bead flange 14 and retaining ring 18 are mounted on the rim. Upon inflation of the mounted tire, the separable bead flange 14 is moved outboardly by the outboard tire bead 16o to engage the retaining ring 18 in a forceful manner. Seating of the bulbous portion 18a of the retaining ring 18 in the annular rim groove 20 locks the separable bead flange 14 on the wheel rim. Alternatively, it will be appreciated that when the wheel 10 is rotating at high speed, a deflated tire will allow the outboard tire bead 16o to move inboardly which in turn allows the separable bead flange 14 to also move in the same direction. In this circumstance, the locked and abutting engagement between the flange 14 and the retaining ring 18 is lost and the high centrifugal forces which are present will tend to expand the split retaining ring 18 sufficient to throw it free from its seating in the groove 20 and off of the wheel rim 10. The separable bead flange 14 and tire may then also be forced off of the rim creating a very dangerous and hazardous situation.

Figure 2:
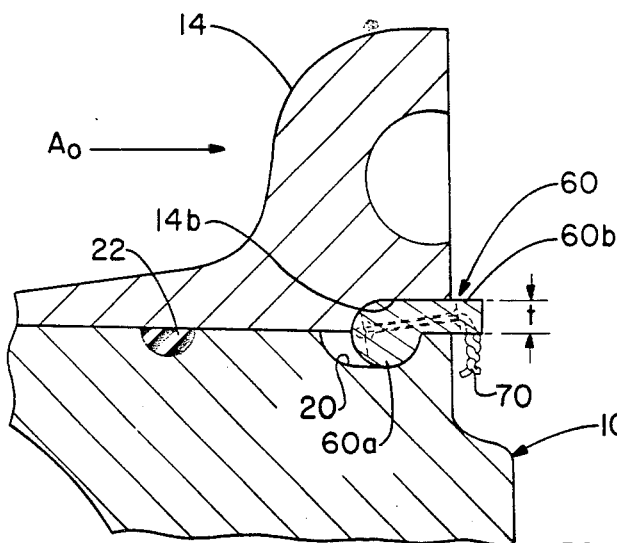
FIG. 2 is a greatly enlarged partial elevational view, in cross-section, showing a separable bead flange and retaining ring configuration in accordance with this invention.

Now therefore, the present invention provides a unique configuration for a retaining ring 18 having means to lock the ring on the wheel rim during the period of high centrifugal force such that the separable bead flange 14 and tire are retained on the wheel rim. Referring to the drawings, a retaining ring generally indicated by numeral 60 is illustrated in accordance with the teaching of this invention. While the retaining ring 60 may have any cross-sectional geometric configuration without departing from the invention, it is shown in the drawing as having a simple bulbous portion 60a of a circular cross-section which extends into a flange 60b having a thickness "t", and this in the conventional manner of the prior art retaining ring 18 as illustrated in FIG. 1. Mounting of the retaining ring 60 is accomplished in similar fashion and such mounted ring is shown in FIG. 2 as it is received in an annular rim groove 20 by way of its bulbous portion 60a while the flange 60b extends in the outboard direction of arrow $A_o$. Of course, the removable rim flange 14 is locked onto the wheel rim 10 by its interference at 14b with the retaining ring 60 when a tire bead (not shown) of an inflated tire exerts a force on the rim flange 14 in the outboard direction.

Figure 3:
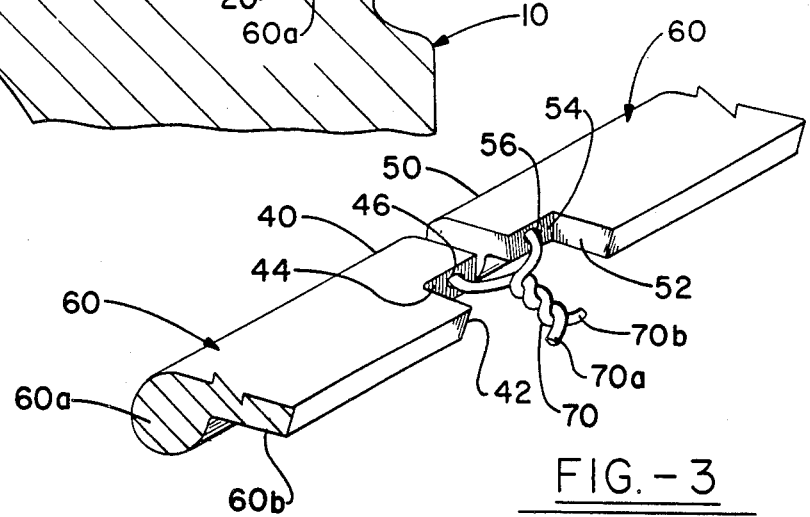
FIG. 3 is a perspective view of the terminal end portion of the retaining ring shown in FIG. 2 illustrating the locking arrangement.

FIG. 3 is a perspective view of a portion of the retaining ring 60, the portion being taken in the area where the ring is split and which defines circumferentially aligned terminal ends indicated generally at 40 and 50 respectively. Each terminal end is a mirror image of the other and each is characterized by a portion of the retaining ring flange 60b being machined or otherwise removed such as at 42 and 52. The removed portions extend inboardly to terminate at outboard-facing wall surfaces indicated at 44 and 54 respectively. A drilled-through bore 46 passes through the terminal end 40 from the outboard-facing wall surface 44 and extends inboardly in the axial direction of the ring 60 and through the bulbous portion 60a. In like manner, a drilled-through bore 56 passes through the terminal end 50 from the outboard-facing wall surface 54 and extends inboardly in the axial direction through the bulbous portion 60a of that terminal end. The terminal ends 40, 50 are maintained in a spaced-apart circumferential relationship by a lockwire 70 which has its terminal ends 70a and 70b twisted together in a locking configuration.

Figure 4:
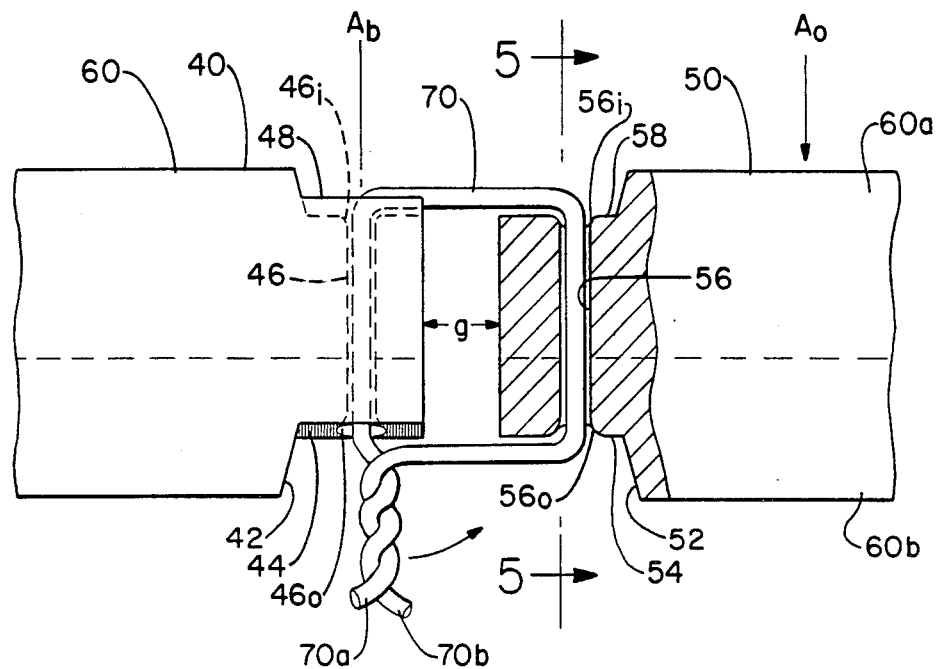
FIG. 4 is a top plan view of the retaining ring showing but a portion of the ring in the area of the split which defines terminal ends in the ring with a portion of one terminal end being broken away.
Figure 5:
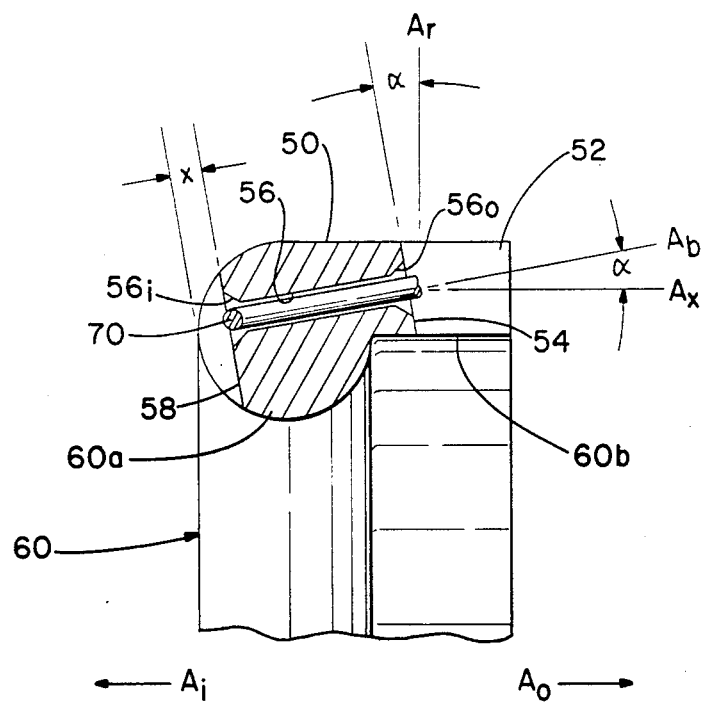
FIG. 5 is a cross-sectional elevational view through a terminal end as may be taken on line 5—5 of FIG. 4.

More specifically now with reference to FIGS. 4 and 5 of the drawings, the terminal ends 40 and 50 are illustrated in greatly enlarged plan and elevational views. As mentioned above, the terminal ends 40, 50 have portions of the retaining ring flange 60b removed resulting in exposed outboard-facing surfaces at 44 and 54. The surfaces 44, 54 are disposed at an angle "α" with respect to a retaining ring radial axis indicated at $A_r$, which is perpendicular to a line drawn parallel to the retaining ring rotational axis indicated at $A_x$. The angle "α" may be any value but is preferably about 10 degrees. The drilled-through bores 46, 56 have parallel axes $A_b$ which are also disposed at the angle "α" but these are with respect to the line drawn parallel to the retaining ring rotational axis $A_x$ as shown in FIG. 5. Accordingly, each bore axis $A_b$ is perpendicular to a respective outboard-facing wall surface 44, 54.

As evident from FIG. 4, the lockwire 70 is continuous from the terminal end 40 to the opposite terminal end 50, being twisted together at its outboard terminations 70a, 70b to thus draw the wire to closely conform to the terminal ends. However, to eliminate any possible interference between the wire 70 and the separable rim flange 14 in their mounted relationship, a portion of the inboard-facing bulbous portion 60a is machined or otherwise removed to the extent of inboard-facing wall surfaces indicated at 48 and 58 for each terminal end 40, 50 respectively. The amount of the removed portion is dependent upon the size and/or gauge of the lockwire 70 being used and will preferably be greater than the wire diameter to account for the bend radius of the wire where it exits the bores 46, 56. The amount of the removed portion is indicated in FIG. 5 at "X" and clearly the inboard-facing wall surfaces 48, 58 are also perpendicular to the bore axes $A_b$. The bores 46, 56 have chamferred ports $46_o$, $56_o$ at the outboard end and chamferred ports $46_i$, $56_i$ at the inboard end to enhance wire tightening and provide a smooth transition for the lockwire 70 from one terminal end to the other. Thus the lockwire 70 will be totally recessed within the confines of the bulbous portion 60a when it is twisted and drawn down to conform to its final locked position. Further, the twisted-together lockwire ends 70a, 70b may be turned into the outboard-facing recess which is defined by the removed flange portions at 42, 52 and in this manner be totally within the confines of the retaining ring 60.

The relationship of the lockwire 70 with the terminal ends 40, 50 and their respective angular bores 46, 56 results in a retaining ring locking configuration that is efficiently accomplished by personnel when servicing aircraft wheel. For example, in the operation of assembling a wheel, a tire and separable rim flange are positioned inboardly on the wheel rim 10. The retaining ring 60 is mounted in the annular groove 20 provided for it in the wheel rim 10a and, prior to inflating the tire, the lockwire 70 is fed through the terminal end bores 46, 56 and twisted to bring the retaining ring terminal ends 40, 50 into a predetermined registration. The predetermined registration is established in a gap between the ends 40, 50 which is indicated at "g" in FIG. 4 and this is such that the ring 60 is drawn down into the groove 20 but not so tightly as to keep it from being rotated by hand within the groove. When the tire is inflated, the separable rim flange 14 is driven outboardly to forcefully engage the retaining ring 60 and this relationship relieves the lockwire 70 of any tensile force which may have been exerted on it prior to inflation of the tire. Thus, in a normal operational condition, the lockwire 70 is not under any type loading. However, when a deflated tire condition occurs at high rotational wheel speed and the outboard tire bead 16o and rim flange 14 are moved in the inboard direction, the centrifugal forces which tend to expand the retaining ring 60 are taken up in the lockwire 70. The lockwire 70 thus functions to maintain the retaining ring 60 in the groove 20 and thus also retains the separable rim flange 14 and tire on the wheel rim until such time that the danger is passed.

What is claimed is:

1. In a wheel rim assembly having an inboard tire bead flange and a separable outboard tire bead flange and a retaining ring having a split defining circumferentially oriented terminal ends, said retaining ring having an inboard facing bulbous portion which extends into an outboard facing flange portion and the bulbous portion is received within an annular groove in the rim to secure the separable tire bead flange on the rim an improved configuration for a locking retaining ring characterized in that each terminal end of the ring has a circumferential extent of both the outboard facing flange and the inboard facing bulbous portions removed forming respective outboard facing and inboard facing wall surfaces and a drilled-through bore extends through each terminal end in an axial direction of the retaining ring from the outboard facing wall surface to the inboard facing wall surface, said bores having axes in parallel alignment and angularly disposed with respect to a rotational axis of the retaining ring and a steel lockwire is carried within the drilled-through bores and is continuous from one bore to the other about the bulbous portion of the ring, said lockwire having terminal ends which extend outboardly from a respective bore in a terminal end and these are twisted together such as to draw the retaining ring terminal ends together in a predetermined spaced-apart curcumferential orientation.

2. A configuration for a locking retaining ring as set forth in claim 1 wherein the outboard and inboard facing wall surfaces are disposed at an angle within the range of 5–15 degrees with respect to a rotational axis of the retaining ring.

3. The configuration for a locking retaining ring as set forth in claim 2 wherein the angle is approximately ten degrees.

4. The configuration for a locking retaining ring as set forth in claim 1 wherein the outboard and inboard facing wall surfaces are perpendicularly disposed with respect to the axes of the drilled-through bores.

* * * * *